(12) United States Patent
Lee et al.

(10) Patent No.: US 12,523,084 B2
(45) Date of Patent: Jan. 13, 2026

(54) DOOR OPEN-CLOSE DEVICE FOR VEHICLE

(71) Applicants: Hyundai Motor Company, Seoul (KR); Kia Corporation, Seoul (KR); PHA CO., LTD., Daegu (KR)

(72) Inventors: Jaeseung Lee, Hwaseong-si (KR); Gookhyun Jeon, Hwaseong-si (KR); Seong Tae Hong, Daegu (KR); Moon Gyu Choi, Daegu (KR)

(73) Assignees: Hyundai Motor Company, Seoul (KR); Kia Corporation, Seoul (KR); PHA CO., LTD., Daegu (KR)

( * ) Notice: Subject to any disclaimer, the term of this patent is extended or adjusted under 35 U.S.C. 154(b) by 0 days.

(21) Appl. No.: 18/900,233

(22) Filed: Sep. 27, 2024

(65) Prior Publication Data
US 2025/0230696 A1   Jul. 17, 2025

(30) Foreign Application Priority Data
Jan. 16, 2024   (KR) ........................ 10-2024-0006589

(51) Int. Cl.
*E05F 15/646* (2015.01)
*B60J 5/06* (2006.01)
(Continued)

(52) U.S. Cl.
CPC .............. *E05F 15/646* (2015.01); *B60J 5/06* (2013.01); *E05D 15/1081* (2013.01); *E05F 15/638* (2015.01); *E05F 15/662* (2015.01); *E05D 2015/1071* (2013.01); *E05D 2015/1097* (2013.01); *E05Y 2201/434* (2013.01); *E05Y 2900/531* (2013.01)

(58) Field of Classification Search
CPC .............. E05F 15/646; E05D 15/1081; E05D 2015/1071; E05D 2015/1097
See application file for complete search history.

(56) References Cited

U.S. PATENT DOCUMENTS 3,386,204 A * 6/1968 Obata ................. E05D 15/1068
                                                                49/212
4,135,760 A * 1/1979 Grossbach .......... E05D 15/1081
                                                                296/155
(Continued)

FOREIGN PATENT DOCUMENTS

DE   102017001338 A1 *  8/2018  ......... E05D 15/1081
DE   102024132087 A1 *  7/2025  ............ E05F 15/643
(Continued)

*Primary Examiner* — Catherine A Kelly
(74) *Attorney, Agent, or Firm* — Morgan Lewis & Bockius LLP

(57) ABSTRACT

A door open-close device for a vehicle configured to open or close a door opening portion by sliding and popping up a door formed in a vehicle body includes a driving unit configured to provide a driving force for sliding and pop-up operations of the door; a gear unit configured to receive the driving force from the driving unit and cause the door to pop up; a pulley-belt unit configured to receive the driving force from the driving unit and allow the door to slide; and a rail unit engaged to the pulley-belt unit, connected to the door and configured to provide a path for the door to slide by operation of the pulley-belt unit.

18 Claims, 21 Drawing Sheets

(51) Int. Cl.
  *E05D 15/10* (2006.01)
  *E05F 15/638* (2015.01)
  *E05F 15/662* (2015.01)

(56) References Cited

U.S. PATENT DOCUMENTS

| | | | | |
|---|---|---|---|---|
| 5,893,236 A | * | 4/1999 | Krbec | E05F 15/652 |
| | | | | 49/210 |
| 6,684,567 B2 | * | 2/2004 | Heidrich | B61D 19/008 |
| | | | | 49/213 |
| 9,752,366 B2 | * | 9/2017 | Pellegrini | E05F 15/00 |
| 9,931,913 B2 | * | 4/2018 | Prevost | E05F 15/646 |
| 10,458,166 B2 | * | 10/2019 | Yamaguchi | E05F 5/003 |
| 10,889,307 B2 | * | 1/2021 | Sakaki | B61D 19/003 |
| 11,933,093 B2 | * | 3/2024 | Heidrich | E05D 15/1044 |
| 2025/0230695 A1 | * | 7/2025 | Lee | E05F 15/638 |

FOREIGN PATENT DOCUMENTS

| | | | | | |
|---|---|---|---|---|---|
| EP | 0940278 | A2 | * | 9/1999 | B60J 5/12 |
| EP | 2184431 | A1 | * | 5/2010 | E05F 15/565 |
| FR | 2880842 | A1 | * | 7/2006 | E05D 15/1047 |
| FR | 2890003 | A1 | * | 3/2007 | E05D 15/1081 |
| FR | 2891497 | A1 | * | 4/2007 | E05D 15/1081 |
| GB | 2403265 | A | * | 12/2004 | E05F 15/565 |
| KR | 20250111894 | A | * | 7/2025 | E05F 15/649 |
| KR | 20250112339 | A | * | 7/2025 | E05F 15/652 |
| WO | WO-2019215353 | A1 | * | 11/2019 | E05C 19/14 |

* cited by examiner

DOOR OPEN-CLOSE DEVICE FOR VEHICLE

CROSS-REFERENCE TO RELATED APPLICATION

The present application claims priority to Korean Patent Application No. 10-2024-0006589 filed on Jan. 16, 2024, the entire contents of which is incorporated herein for all purposes by this reference.

BACKGROUND OF THE PRESENT DISCLOSURE

Field of the Present Disclosure

The present disclosure relates to a door open-close device for a vehicle, and more particularly, to a bi-directional door open-close device for a vehicle configured to open or close a door opening portion of a vehicle body by sliding and popping up a door of the vehicle in both front and rear directions, in the vehicle without a B-pillar.

Description of Related Art

In general, doors for a vehicle are doors that separate the interior and exterior of the vehicle, and serve an important function of protecting passengers safely by blocking external noise, rain, dust, and wind, etc and absorbing an impact along with a side structure in case of a side collision.

There are various types of doors for the vehicle, including doors for special purposes, but hinged swing doors are most often applied to passenger vehicles.

Usually, a swing door refers to a door that opens to the outside of a vehicle body around a hinge shaft installed through a hinge bracket between the vehicle body and the swing door, and has the advantage of being easy to open or close, and easy to maintain and repair it due to its simple structure.

On the other hand, in some vehicles, a counter-swing door that includes a high sense of openness when a door is opened, and is advantageous for passengers to get on or off is applied. The counter-swing door is opened or closed by use of the rotation of an arm connected to the vehicle body and the door.

However, the counter swing door has the advantage of having a large amount of door opening and closing, but there is a problem of an excessive amount of protrusion to the outside of the vehicle when the door is opened due to a length of the arm. Furthermore, as shown in FIG. 1 and FIG. 2, in a 3-point sliding door/rail structure in which an upper rail U, a center rail C, and a lower rail L are applied to a vehicle body 1, a door opening amount b is limited according to a length a of the center rail C. Considering the design such as a lamp position of a vehicle and short overhang, it is difficult to increase the door opening amount b when the center rail C exists. Therefore, there is a problem that a design and a degree of freedom of package of the vehicle are limited.

Therefore, as shown in the vehicle body 1 having a door 2 in FIG. 3 and FIG. 4, it is necessary to maximize a door opening amount c by not applying a center rail at a position 'A'.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door open-close device for a vehicle configured for removing a center rail/door arm structure from a counter sliding door structure of a vehicle without a B-pillar and implementing sliding and pop-up operations of a door by an upper rail/door arm structure, and thus, a door opening width is maximized without design and package constraints and simultaneously a door rotation radius is minimized, minimizing an amount of protrusion toward the outside of a vehicle body of the door when the door is opened.

According to an exemplary embodiment of the present disclosure, a door open-close device for a vehicle configured to open or close a door opening portion by sliding and popping up a door formed in a vehicle body includes a driving unit configured to provide a driving force for sliding and pop-up operations of the door; a gear unit configured to receive the driving force from the driving unit and cause the door to pop up; a pulley-belt unit configured to receive the driving force from the driving unit and allow the door to slide; and a rail unit engaged to the pulley-belt unit, connected to the door and configured to provide a path for the door to slide by operation of the pulley-belt unit.

The driving unit may include a driving motor; clutches connected to the driving motor and configured to rotate by a rotation force of the driving motor; and an electromagnet to which electric power is supplied or blocked to transmit or block rotation forces of the clutches to the gear unit by selectively coupling the clutches.

The clutches may include a lower plate coaxially connected to a motor shaft of the driving motor and configured to rotate in synchronization with a rotation of the motor shaft; and an upper plate coaxially coupled to the motor shaft and configured to rotate or not rotate according to whether to be in contact with the lower plate by the electromagnet.

In response that the electric power is supplied to the electromagnet, the upper plate and the lower plate may be in contact with each other, and in response that the electric power is not supplied to the electromagnet, the upper plate and the lower plate may be released from contact therebetween.

The gear unit may include a driving gear coaxially connected to the upper plate, coupled to a lower portion of the rail unit, and configured to rotate in synchronization with the upper plate; an intermediate gear engaged with the driving gear and configured to rotate at the lower portion of the rail unit; a lead screw engaged with the intermediate gear and configured to rotate at the lower portion of the rail unit; and a first fixing bracket fixed to the vehicle body, coupled to the lead screw inserted thereinto, and configured to support the driving unit to move toward an outside of the vehicle body in response that the lead screw rotates.

The door open-close device may further include a first guide bar coupled into the first fixing bracket, connected to a lower portion of a first side of the rail unit, configured to extend in a direction parallel to the lead screw, and guide a movement of the lead screw.

The door open-close device may further include a second fixing bracket fixed to the vehicle body; and a second guide bar connected to a lower portion of a second side of the rail unit and slidably coupled to the second fixing bracket.

The rail unit may include a first rail connected to the driving unit, a second rail connected to the first rail and configured to slide and move along the first rail, and a third rail connected to the second rail and configured to slide and move along the second rail.

The second rail may be configured to slide and move in a longitudinal direction of the first rail by rolling of roller bearings provided on the second rail, and the third rail may be configured to slide and move in a longitudinal direction of the second rail by rolling of roller bearings provided on the third rail.

The pulley-belt unit may include pulleys provided on a lower portion of the first rail and engaged to the driving unit to receive a driving force from the driving unit and rotate; a belt coupled to the pulleys and configured to move linearly by rotation of the pulleys; and a belt carrier connected to the belt and configured to move linearly by a movement of the belt.

The pulleys may include a first pulley coaxially connected to the driving gear and connected to the driving gear to rotate at the lower portion of the first rail; and a second pulley connected to rotate on an opposite side to the lower portion of the first rail spaced apart from the first pulley.

The belt carrier may include a first pinion gear engaged with a first rack gear extending in a longitudinal direction of the first rail and formed on a lower surface of the first rail and configured to move.

The belt carrier may be connected to a lower portion of the second rail by a coupling pin.

The pulleys may include a third pulley provided at the lower portion of the second rail and connected to the first pinion gear; and a fourth pulley connected to rotate on an opposite side of the lower portion of the second rail spaced apart from the third pulley.

The third pulley and the fourth pulley may be connected to a belt configured to move linearly by rotation of the third pulley and the fourth pulley.

The fourth pulley may include a second pinion gear engaged with a second rack gear extending and formed in a longitudinal direction of the third rail, and configured to rotate to move the third rail in the longitudinal direction in response that the fourth pulley rotates.

According to an exemplary embodiment of the present disclosure, a center rail/door arm structure is removed from a counter sliding door structure of a vehicle without a B-pillar, and thus, a door opening width may be maximized.

Furthermore, an upper rail/door arm structure in which sliding and pop-up operations of a door are implemented is introduced, and thus, a door rotation radius is minimized, minimizing an amount of protrusion toward the outside of a vehicle body of the door when the door is opened.

Furthermore, a rail unit with a 3-stage telescopic structure is applied, and thus, openness and robustness may be simultaneously secured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
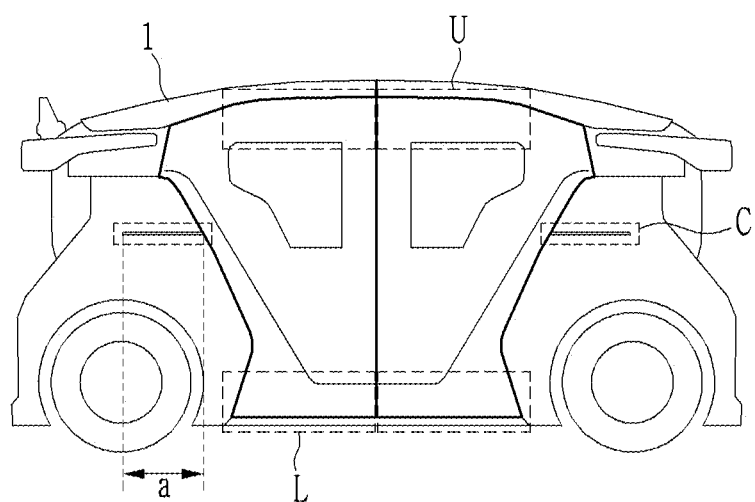
FIG. 1 is a diagram schematically showing a vehicle with a bi-directional swing door of the related art.
Figure 2:
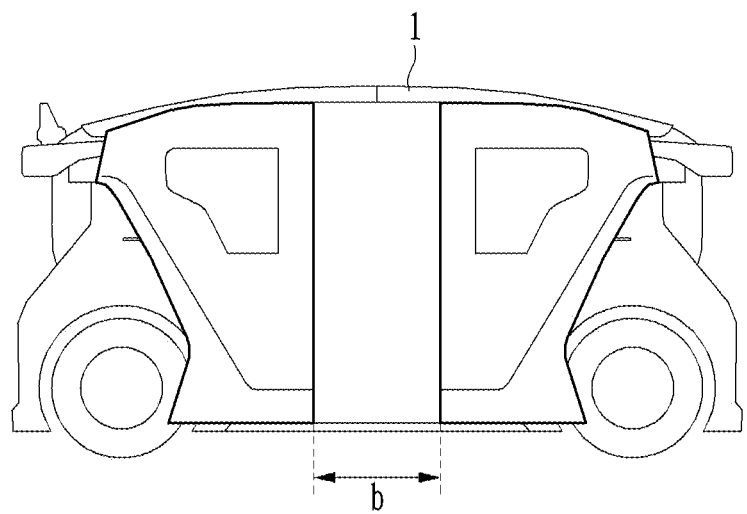
FIG. 2 is a diagram illustrating a state in which a door opening amount is limited in the vehicle with the bi-directional swing door of the related art.
Figure 3:
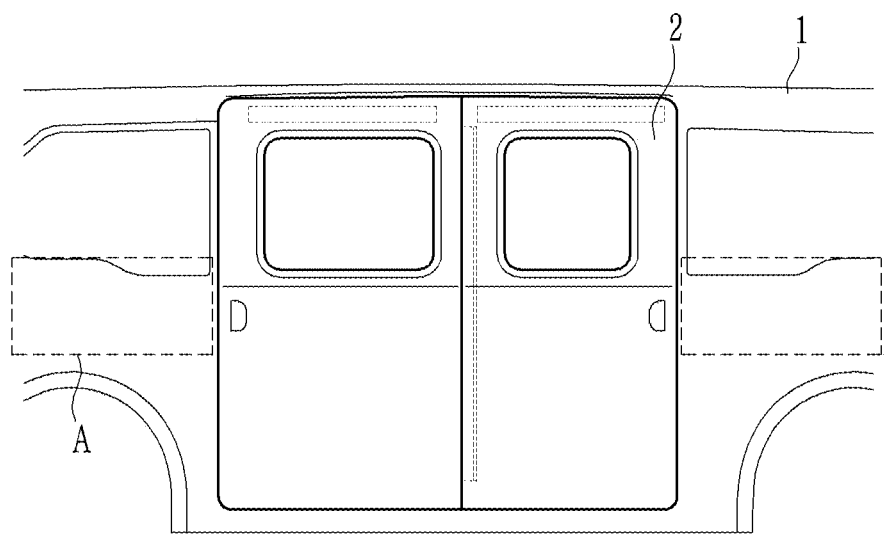
FIG. 3 is a diagram illustrating a state in which a center rail is not applied in the vehicle with the bi-directional swing door of the related art.
Figure 4:
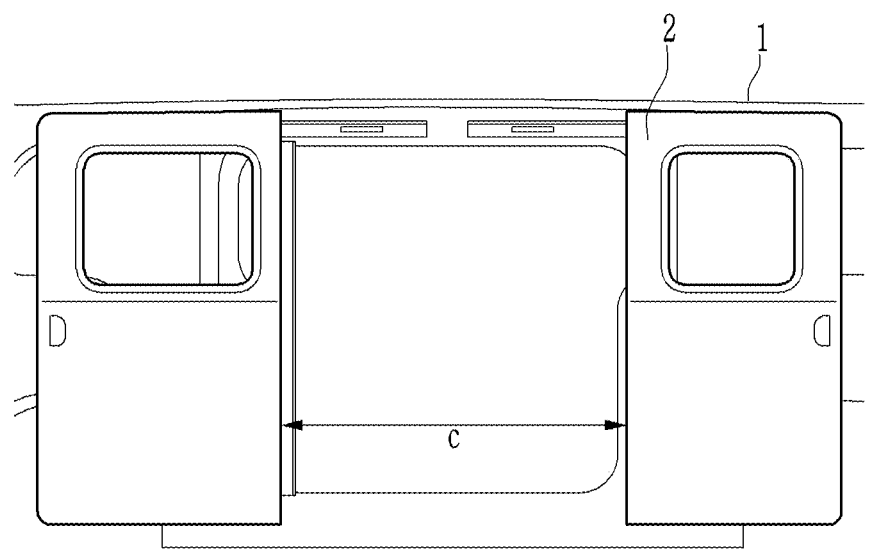
FIG. 4 is a diagram showing a state in which the door opening amount is maximized by not applying a center rail in the vehicle with the bi-directional swing door of the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will be described more fully hereinafter with reference to the accompanying drawings, so that those skilled in the art to which the present disclosure pertains may easily implement the exemplary embodiments of the present disclosure. However, the present disclosure may be implemented in various forms and is not limited to the exemplary embodiments described herein.

Furthermore, in various exemplary embodiments of the present disclosure, elements including the same configuration are typically described in an exemplary embodiment of the present disclosure by use of the same reference numerals, and in other exemplary embodiments of the present disclosure, only configurations different from an exemplary embodiment will be described.

Please be informed that the drawings are schematic and not drawn to scale. Relative dimensions and ratios of parts in the drawings are shown exaggerated or reduced in size for clarity and convenience in the drawings, and any dimensions are illustrative only and not limiting. Furthermore, the same reference numerals are used to denote similar features in the same structure, element or parts appearing in two or more drawings. When an element is referred to as being "on" another element, it may be directly on the other element or intervening elements may also be accompanied.

The exemplary embodiment of the present disclosure specifically represents an exemplary embodiment of the present disclosure. As a result, various modifications of diagrams are expected. Therefore, the exemplary embodiment of the present disclosure is not limited to a specific shape of an area shown, and includes, for example, a modification of the shape by manufacturing.

Hereinafter, a door open-close device for a vehicle according to an exemplary embodiment of the present disclosure will be described in detail with reference to the accompanying drawings.

Figure 5:
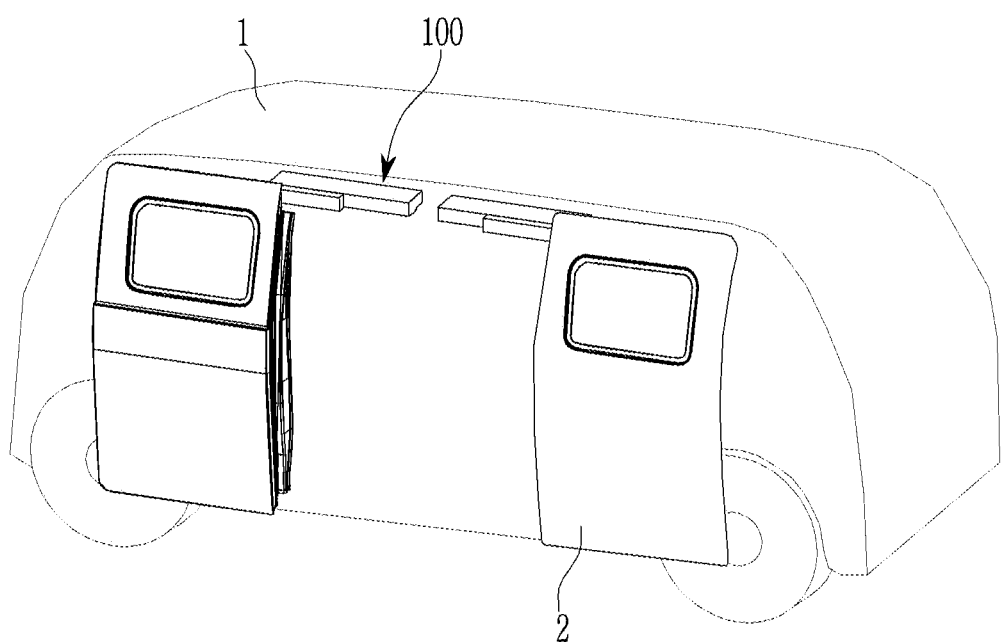
FIG. 5 is a diagram showing a state in which a door open-close device for a vehicle according to an exemplary embodiment of the present disclosure is provided in the vehicle.
Figure 6:
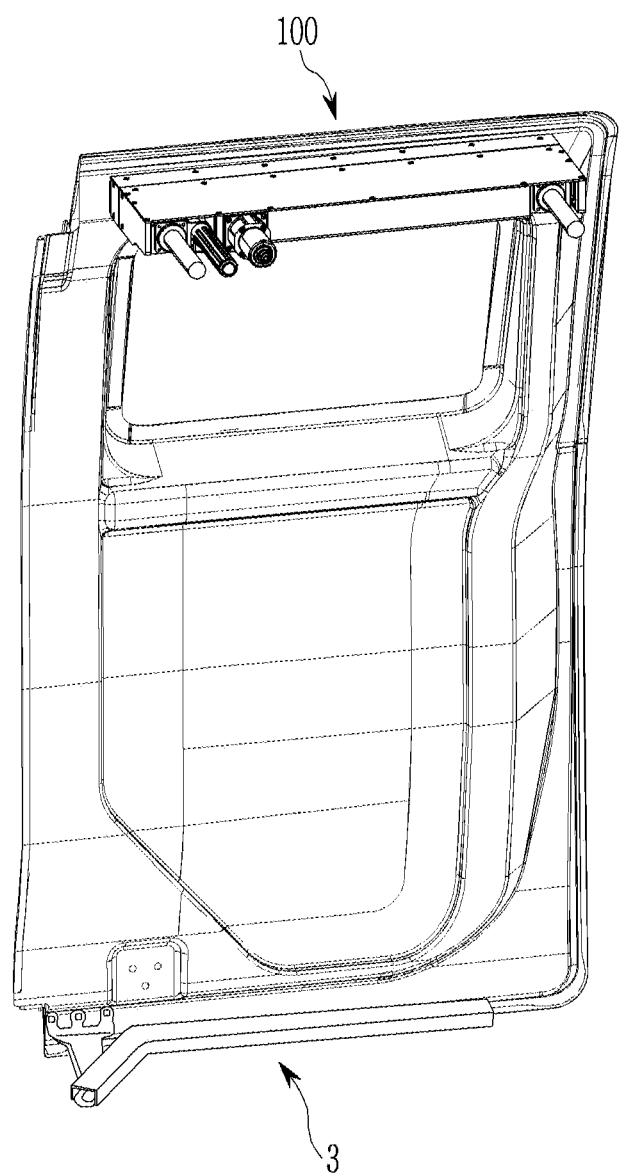
FIG. 6 is a diagram showing a state in which a door open-close device for a vehicle according to an exemplary embodiment of the present disclosure is provided on a door of the vehicle.
Figure 7:
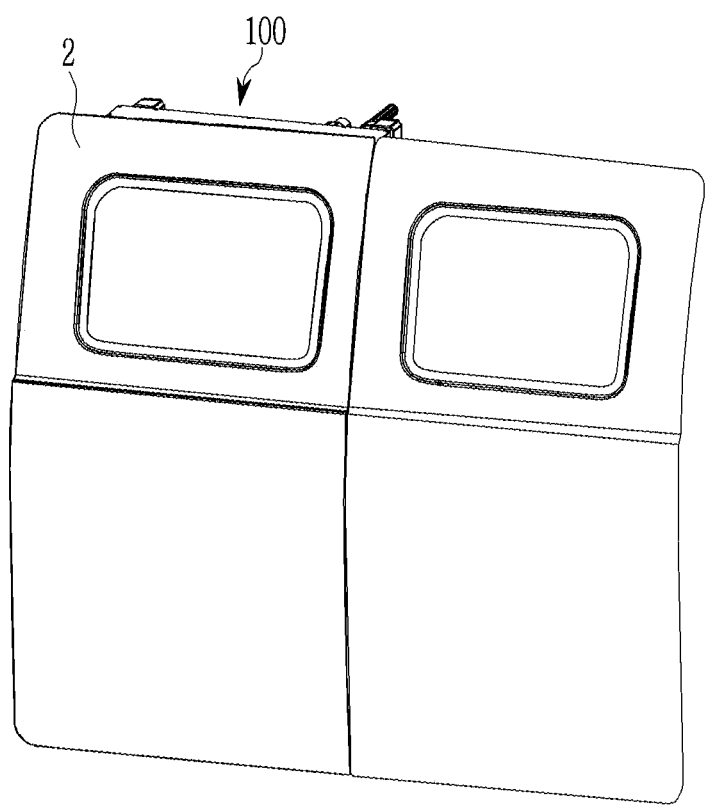
FIG. 7 is a diagram illustrating a closed state of a door of a vehicle to which a door open-close device for the vehicle according to an exemplary embodiment of the present disclosure is applied.
Figure 8:
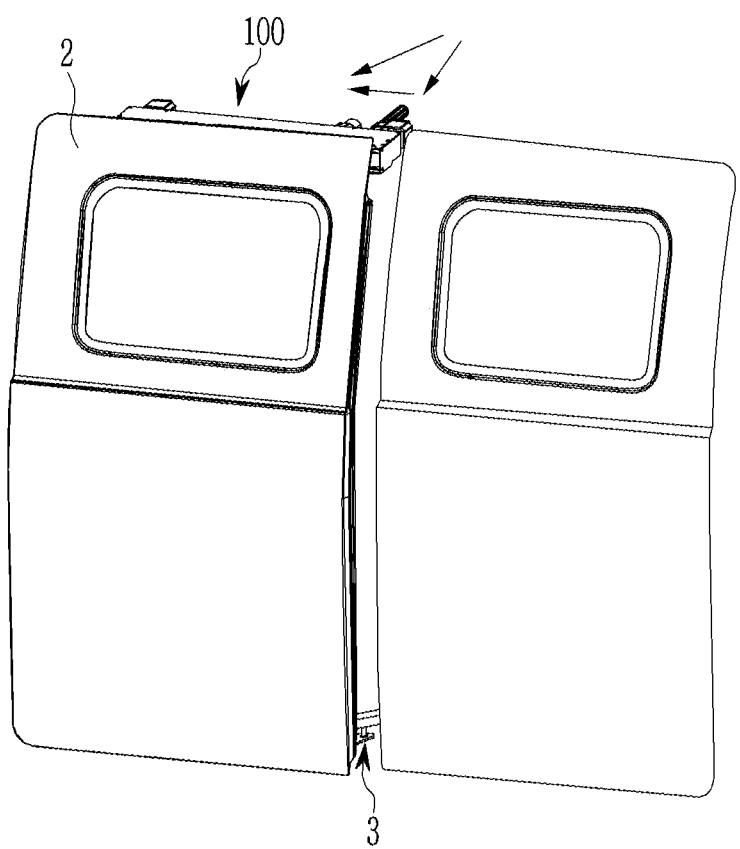
FIG. 8 is a diagram illustrating a pop-up and sliding state of a door of a vehicle to which a door open-close device for the vehicle according to an exemplary embodiment of the present disclosure is applied.
Figure 9:
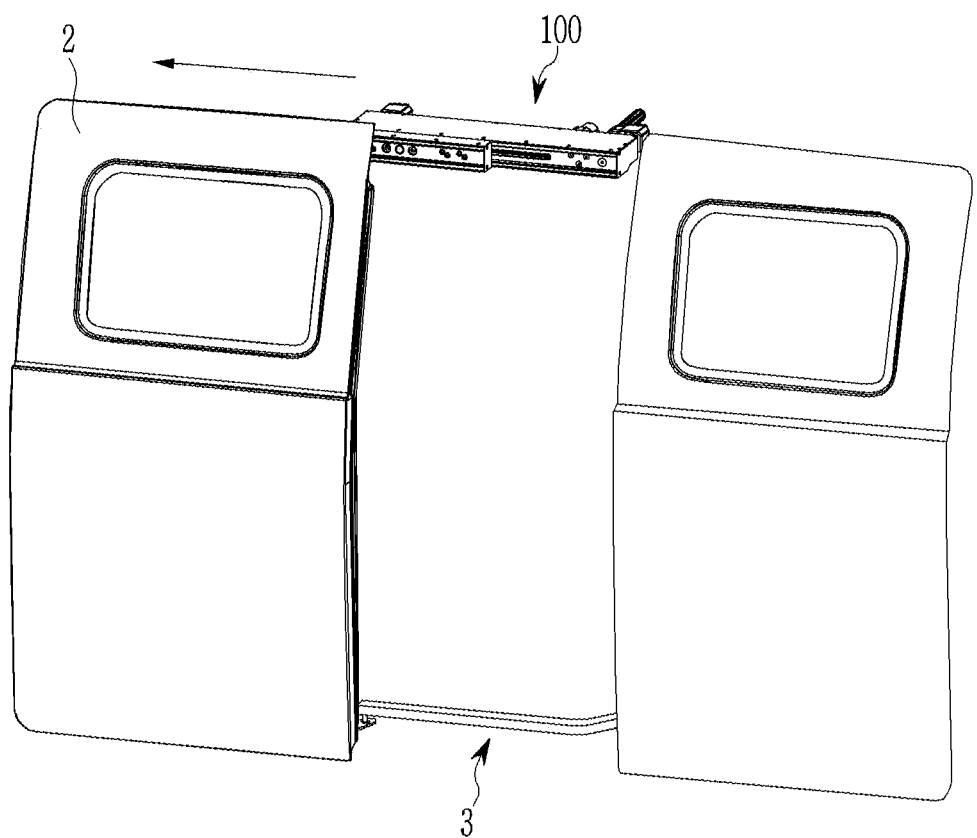
FIG. 9 is a diagram illustrating an opening completion state of a door of a vehicle to which a door open-close device for the vehicle according to an exemplary embodiment of the present disclosure is applied.

FIG. 5 is a diagram showing a state in which a door open-close device for a vehicle according to an exemplary embodiment of the present disclosure is provided in a vehicle. FIG. 6 is a diagram showing a state in which the door open-close device for the vehicle according to an exemplary embodiment of the present disclosure is provided on a door of the vehicle. FIG. 7 is a diagram illustrating a closed state of a door of the vehicle to which the door open-close device for the vehicle according to an exemplary embodiment of the present disclosure is applied. FIG. 8 is a diagram illustrating a pop-up and sliding state of the door of the vehicle to which the door open-close device for the vehicle according to an exemplary embodiment of the present disclosure is applied. FIG. 9 is a diagram illustrating an opening completion state of the door of the vehicle to which the door open-close device for the vehicle according to an exemplary embodiment of the present disclosure is applied.

Referring to FIG. 5 and FIG. 6, a door open-close devices 100 for a vehicle according to an exemplary embodiment of the present disclosure are to open or close a door opening portion by sliding and popping up doors 2 formed on a vehicle body 1 and are provided in an upper portion of the door opening portion of the vehicle body 1.

The door open-close devices 100 may be provided in a pair to face each other on the upper portion of the door opening portion corresponding to the front and rear doors 2, respectively.

The door open-close devices 100 may be provided to connect the outside of the vehicle body 1 and the inside of the door 2, an outermost rail 34 of a rail unit may be attached to the door 2, and fixing brackets 6 and 9 may be attached to the vehicle body 1.

Furthermore, a lower module 3 including a lower rail and a lower arm may be provided in a lower portion of the door opening portion of the vehicle body 1. The lower module 3 may support the door 2 to pop up and slide and move in accordance with vertical balance depending on an operation of the door open-close device 100 for the vehicle according to an exemplary embodiment of the present disclosure.

As shown in FIGS. 7 to 9, in a state in which the door 2 of the vehicle is closed, a driving unit operates so that the door 2 pops up and slides and moves to the outside of the vehicle body 1.

When pop-up of the door 2 is completed, a driving force for the pop-up of the door 2 is blocked by the driving unit and a gear unit, and slides and moves the door 2 in a longitudinal direction of the vehicle body 1. Such operations may be implemented separately over time on the front door 2 and the rear door 2, or may be implemented simultaneously.

Figure 10:
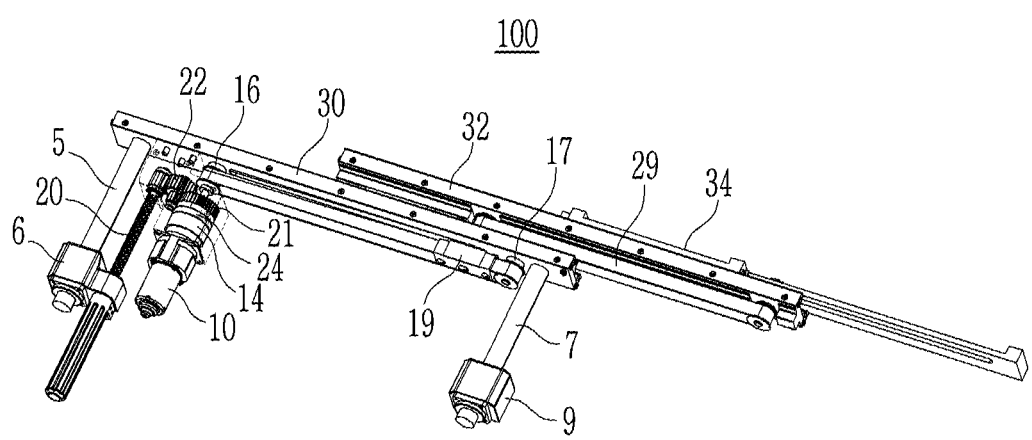
FIG. 10 is a diagram showing a door open-close device for a vehicle according to an exemplary embodiment of the present disclosure.

FIG. 10 is a diagram showing the door open-close device for the vehicle according to an exemplary embodiment of the present disclosure.

Referring to FIG. 10, the door open-close device 100 for the vehicle according to an exemplary embodiment of the present disclosure may include a driving unit, a gear unit, a pulley-belt unit, and a rail unit.

The driving unit provides a driving force for sliding and pop-up operations of the door 2. The driving unit may include a driving motor 10, clutches 14 and 24, and an electromagnet 11. The driving motor 10 receives a signal for opening or closing the door 2 and generates a rotation force through a motor shaft 12.

The driving motor 10 is connected to the clutches 14 and 24 connected to the motor shaft 12 to rotate together, and to the electromagnet 11 to which electric power is supplied or blocked to transmit or block rotation forces of the clutches 14 and 24 to the gear unit. When electric power is supplied to the electromagnet 11, the clutches 14 and 24 are coupled to transmit the rotation forces of the clutches 14 and 24 to the gear unit, and when electric power is not supplied to the electromagnet 11 or is blocked, the clutches 14 and 24 are decoupled and thus the rotation forces of the clutches 14 and 24 is not transmitted to the gear unit.

The clutches 14 and 24 are a lower plate 14 and an upper plate 24. The lower plate 14 is coaxially coupled to the motor shaft 12 of the driving motor 10 and rotates in synchronization with the rotation of the motor shaft 12.

The upper plate 24 is coaxially connected to the motor shaft 12 and rotates or does not rotate according to whether to be in contact with the lower plate 14. Therefore, when electric power is supplied to the electromagnet 11, the upper plate 24 and the lower plate 14 are in contact with each other, and the rotation of the motor shaft 12 and the rotation force of the lower plate 14 are transmitted to the upper plate 24.

However, when electric power is not supplied to the electromagnet 11 or is blocked, the upper plate 24 and the lower plate 14 are released from contact therebetween, and the rotation of the motor shaft 12 and the rotation force of the lower plate 14 are not transmitted to the upper plate 24, and thus, a driving force is not transmitted from the driving unit to the gear unit.

The gear unit includes a driving gear 21 coaxially connected to the clutches 14 and 24, an intermediate gear 22 engaged with the driving gear 21 and rotating, and a lead screw 20 engaged and rotating with the intermediate gear 22. Furthermore, the gear unit further includes the fixing bracket 6 coupled to the lead screw 20 inserted thereinto and fixed to the vehicle body 1.

The driving gear 21 may be coaxially coupled to the upper plate 24 of the clutches 14 and 24 to be rotated in synchronization with the upper plate 24. Furthermore, the intermediate gear 22 may be engaged with the driving gear 21 and rotate, and the lead screw 20 may be engaged with the intermediate gear 22 and rotate.

Therefore, when the upper plate 24 and the lower plate 14 of the clutches 14 and 24 are in contact with each other, the driving force of the driving motor 10 may be transmitted to the lead screw 20 through the upper plate 24 and the driving gear 21 via the intermediate gear 22.

The lead screw 20 is inserted into and coupled to the fixing bracket 6, and an external surface of the lead screw 20 and an internal surface of the fixing bracket 6 are screw-coupled. Accordingly, when the lead screw 20 rotates, the lead screw 20 may move in a front and rear direction with respect to the fixing brackets 6 and 9. Because the fixing bracket 6 is coupled to the vehicle body 1, the driving unit, the gear unit, the pulley-belt unit, and the rail unit may pop up or be released from the pop-up in a direction perpendicular to the longitudinal direction of the vehicle body 1 by a movement of the lead screw 20.

Meanwhile, guide bars 5 and 7 connected to lower portions of both sides of the rail unit and extending in a direction parallel to the lead screw 20 may be inserted into the fixing brackets 6 and 9. One end portion of the guide bars 5 and 7 may be coupled to the lower surface of the rail unit, and as the lead screw 20 moves, the guide bars 5 and 7 may move together while supporting the rail unit.

The pulley-belt unit includes a plurality of pulleys 16, 17, 35, and 39 provided in the rail unit, a belt 18 connected between the pulleys 16, 17, 35, and 39, and a belt carrier 19 disposed on a rail 30 of a driving unit side of the rail unit.

The driving force of the driving unit rotates the pulleys 16, 17, 35, and 39, and the rotation forces of the pulleys 16, 17, 35, and 39 causes the belt 18 to move linearly in the longitudinal direction of the rail unit. The rail unit is provided to serially slide and move by engaging pinion gears 31 and 37 and rack gears 33 and 38.

The pulley-belt unit may include the first pulley 16 coaxially connected to the driving gear 21 and connected to rotate at a lower portion of the first rail 30, and the second pulley 17 connected to rotate on the opposite side to the lower portion of the first rail 30 spaced apart from the first pulley 16. The first pulley 16 and the second pulley 17 may be connected to each other by the belt 18, and the belt 18 may move linearly by rotation of the first pulley 16 and the second pulley 17.

The rail unit is coupled to an internal surface of the door 2, and slides and moves by operation of the pulley-belt unit to cause the door 2 to slide.

The rail unit includes a first rail 30 connected to the driving unit, a second rail 32 connected to the first rail 30 and sliding and moving along the first rail 30, and a third rail 34 connected to the second rail 32 and sliding and moving along the second rail 32.

Figure 11:
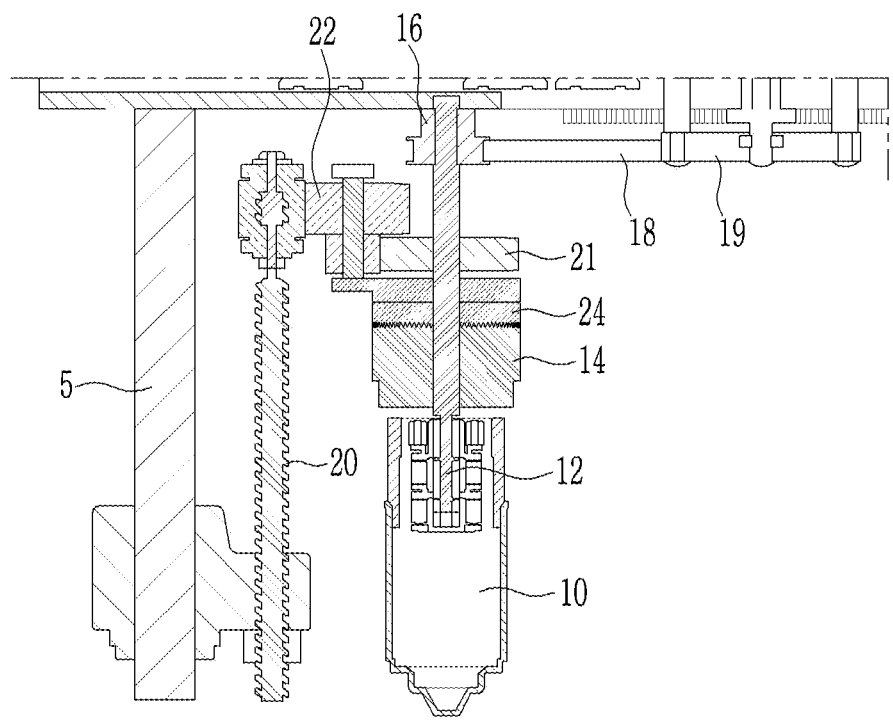
FIG. 11 is a diagram showing a pop-up and sliding operation state of a door open-close device for a vehicle according to an exemplary embodiment of the present disclosure by a driving unit and a gear unit.
Figure 12:
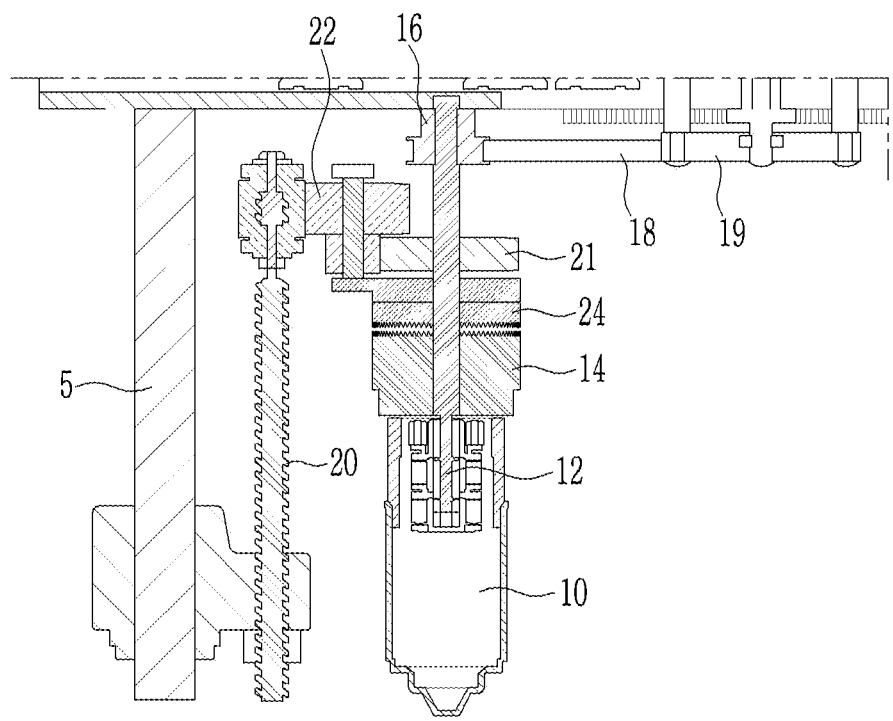
FIG. 12 is a diagram showing a sliding operation state of a door open-close device for a vehicle according to an exemplary embodiment of the present disclosure by a driving unit and a gear unit.
Figure 13:
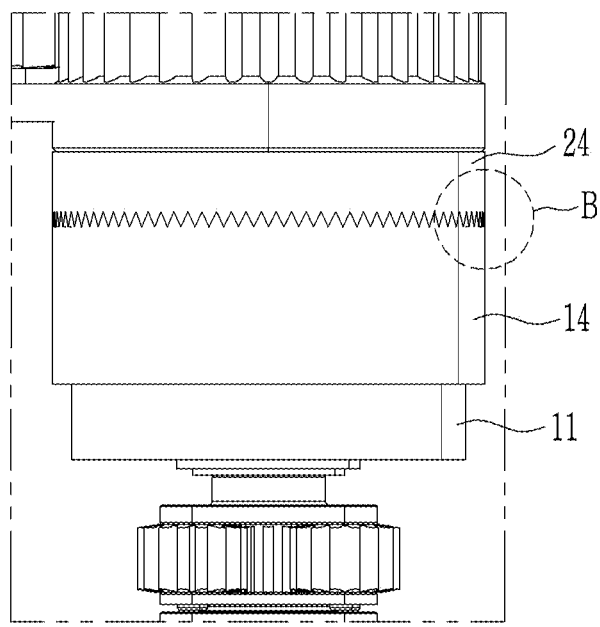
FIG. 13 is a diagram showing a power transmission state of a door open-close device for a vehicle according to an exemplary embodiment of the present disclosure by clutches of a driving unit.
Figure 14:
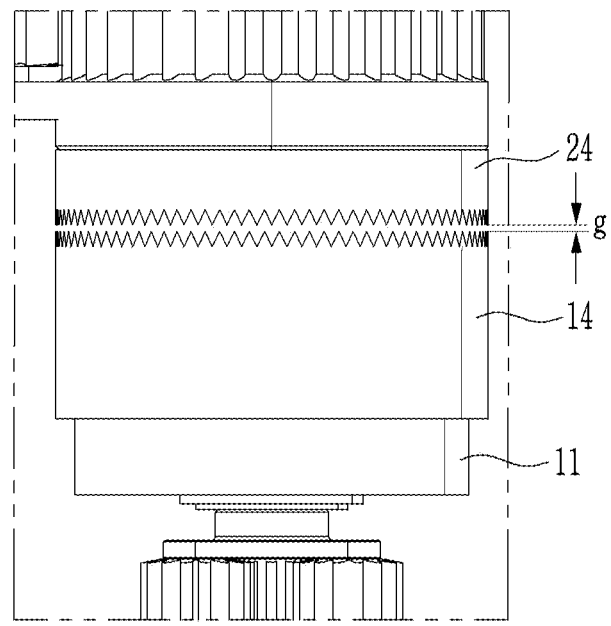
FIG. 14 is a diagram showing a power transmission release state of a door open-close device for a vehicle according to an exemplary embodiment of the present disclosure by clutches of a driving unit.

FIG. 11 is a diagram showing a pop-up and sliding operation state of the door open-close device for the vehicle according to an exemplary embodiment of the present disclosure by a driving unit and a gear unit. FIG. 12 is a diagram showing a sliding operation state of the door open-close device for the vehicle according to an exemplary embodiment of the present disclosure by the driving unit and the gear unit. FIG. 13 is a diagram showing a power transmission state of the door open-close device for the vehicle according to an exemplary embodiment of the present disclosure by clutches of a driving unit. FIG. 14 is a diagram showing a power transmission release state of the door open-close device for the vehicle according to an exemplary embodiment of the present disclosure by the clutches of the driving unit.

Referring to FIGS. 11 and 13, when an opening signal of the door 2 is applied, electric power is supplied to the electromagnet 11, and the upper plate 24 and the lower plate 14 of the clutches 14 and 24 are in contact with each other. Because the upper plate 24 and the lower plate 14 of the clutches 14 and 24 are engaged and coupled, when the lower plate 14 rotates, the upper plate 24 rotates together.

When a driving force is generated in the driving motor 10 and the motor shaft 12 rotates, the lower plate 14 of the clutches 14 and 24 coaxially connected thereto rotates, and the upper plate 24 of the clutches 14 and 24 coupled thereto rotates. The rotation of the upper plate 24 of the clutches 14 and 24 rotates the driving gear 21, the driving gear 21 rotates the intermediate gear 22, and the intermediate gear 22 rotates the lead screw 20. The lead screw 20 moves linearly while rotating in the fixing bracket 6, and pops up the door open-close device 100 to the outside of the vehicle body 1 together with the guide bars 5 and 7.

Simultaneously, the first pulley 16 coaxially connected to the motor shaft 12 rotates, and the first pulley 16 rotates together with the second pulley 17 to linearly move the belt 18. The movement of the belt 18 slides and moves the second rail 32 and the third rail 34 disposed on an upper portion of the first rail 30 by the engagement of the pinion gears 31 and 37 with the rack gears 33 and 38.

Referring to FIGS. 12 and 14, in a state in which a pop-up movement of the door 2 is sufficiently completed, a power supply to the electromagnet 11 is blocked. The upper plate 24 and the lower plate 14 of the clutches 14 and 24 are released from contact, and a gap g is generated. In the instant case, although the driving motor 10 continuously operates, the driving force of the driving motor 10 does not rotate the upper plate 24. Accordingly, the driving force of the driving motor 10 is not transmitted to the gear unit connected to the upper plate 24, and thus, the pop-up of the door 2 is stopped.

The driving force of the driving motor 10 rotates the first pulley 16 coaxially connected to the motor shaft 12, rotates together with the second pulley 17 to move the belt 18 linearly, and continues until the second rail 32 and the third rail 34 that are connected to the first rail 30 by the pinion gears 31 and 37 and the rack gears 33 and 38 to serially slide and move are sufficiently slid and moved.

Figure 15:
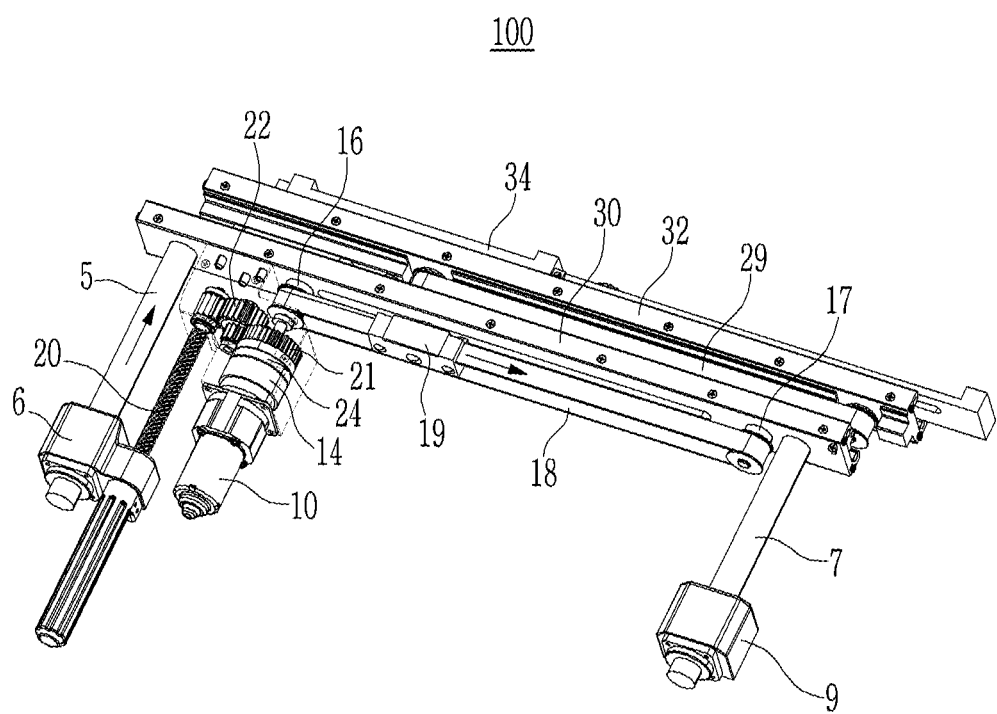
FIG. 15 is a diagram showing a pop-up and sliding operation state of a door open-close device for a vehicle according to an exemplary embodiment of the present disclosure through power transmission by clutches.
Figure 16:
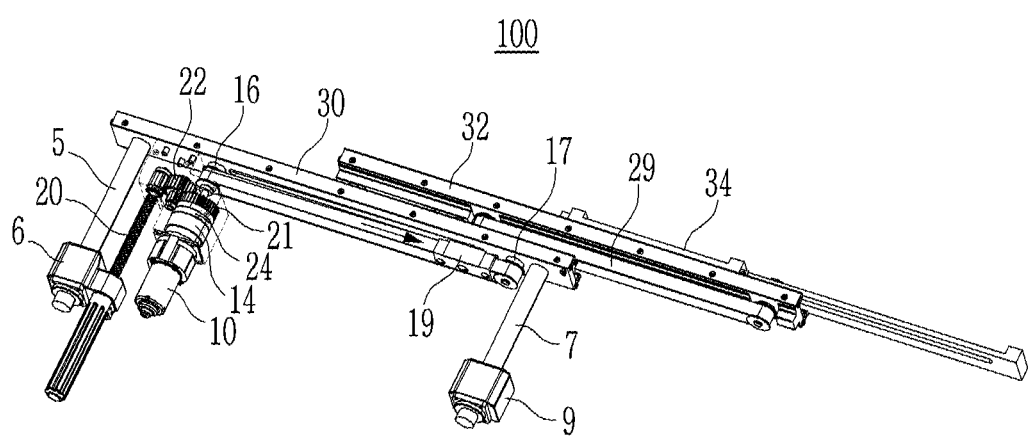
FIG. 16 is a diagram showing a sliding operation state of a door open-close device for a vehicle according to an exemplary embodiment of the present disclosure through power transmission release by clutches.

FIG. 15 is a diagram showing a pop-up and sliding operation state of the door open-close device for the vehicle according to an exemplary embodiment of the present disclosure through power transmission by clutches. FIG. 16 is a diagram showing a sliding operation state of the door open-close device for the vehicle according to an exemplary embodiment of the present disclosure through power transmission release by the clutches.

As shown in FIG. 15, a driving force of the driving motor 10 is transmitted to a gear unit by the clutches 14 and 24, and the gear unit moves the lead screw 20 to the outside of the vehicle body 1 to cause the door 2 pop up. At the same time, the driving force of the driving motor 10 rotates the first pulley 16 to move the belt 18 linearly in a longitudinal direction of a rail unit.

A belt carrier 19 may be connected to the belt 18 and move linearly by a movement of the belt 18 may be provided in the belt 18. A first pinion gear 31 and a coupling pin 15 connected to and fixed to a lower portion of the second rail 32 are provided in the belt carrier 19. A movement of the belt carrier 19 causes the second rail 32 to slide and move, and movement of the second rail 32 causes the third rail 34 to slide and move.

As shown in FIG. 16, when a pop-up movement of the door 2 is sufficiently completed, the clutches 14 and 24 do not transmit the driving force of the driving motor 10 to the gear unit and stop the pop-up of the door 2.

The driving force of the driving motor 10 rotates the first pulley 16 to move the belt 18 linearly in a longitudinal direction of the rail unit, and the belt carrier 19 connected to the belt 18 continues to move a point where the second pulley 17 is located. Accordingly, the second rail 32 and the third rail 34 continue to slide in succession until the opening amount of the door 2 reaches its maximum.

Figure 17:
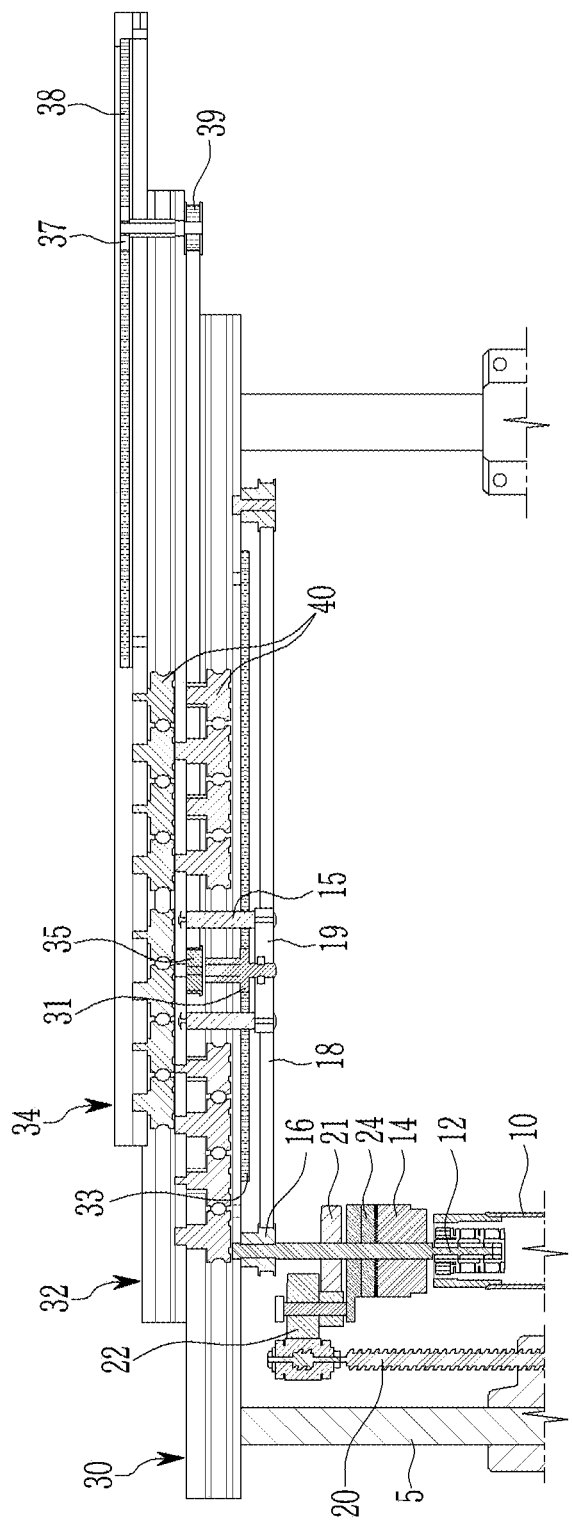
FIG. 17 is a front diagram showing cross sections of a pulley-belt unit and a rail unit of a door open-close device for a vehicle according to an exemplary embodiment of the present disclosure.
Figure 18:
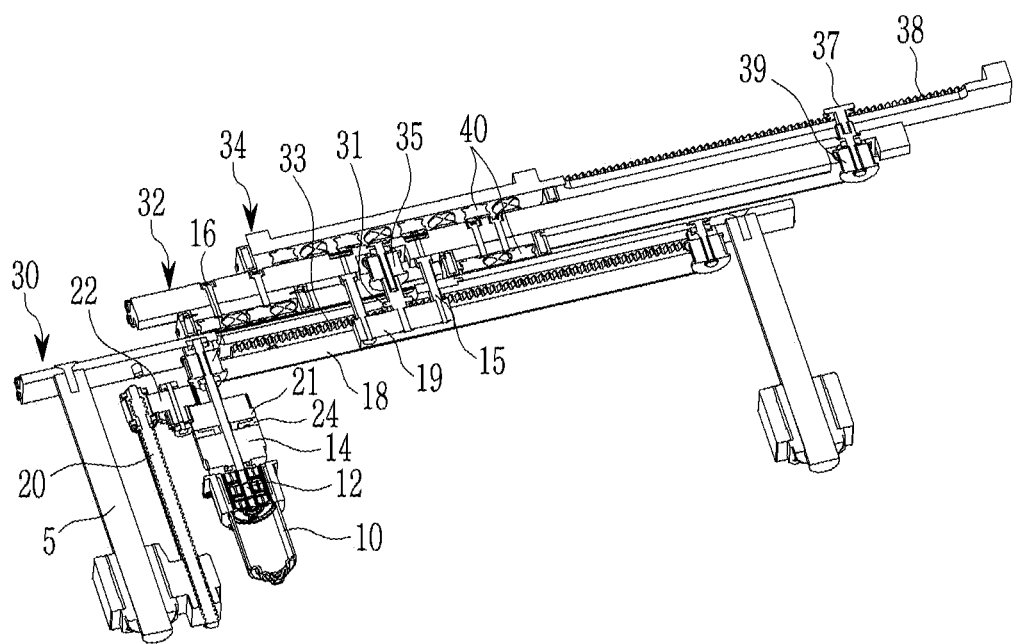
FIG. 18 is a perspective view showing cross sections of a pulley-belt unit and a rail unit of a door open-close device for a vehicle according to an exemplary embodiment of the present disclosure.
Figure 19:
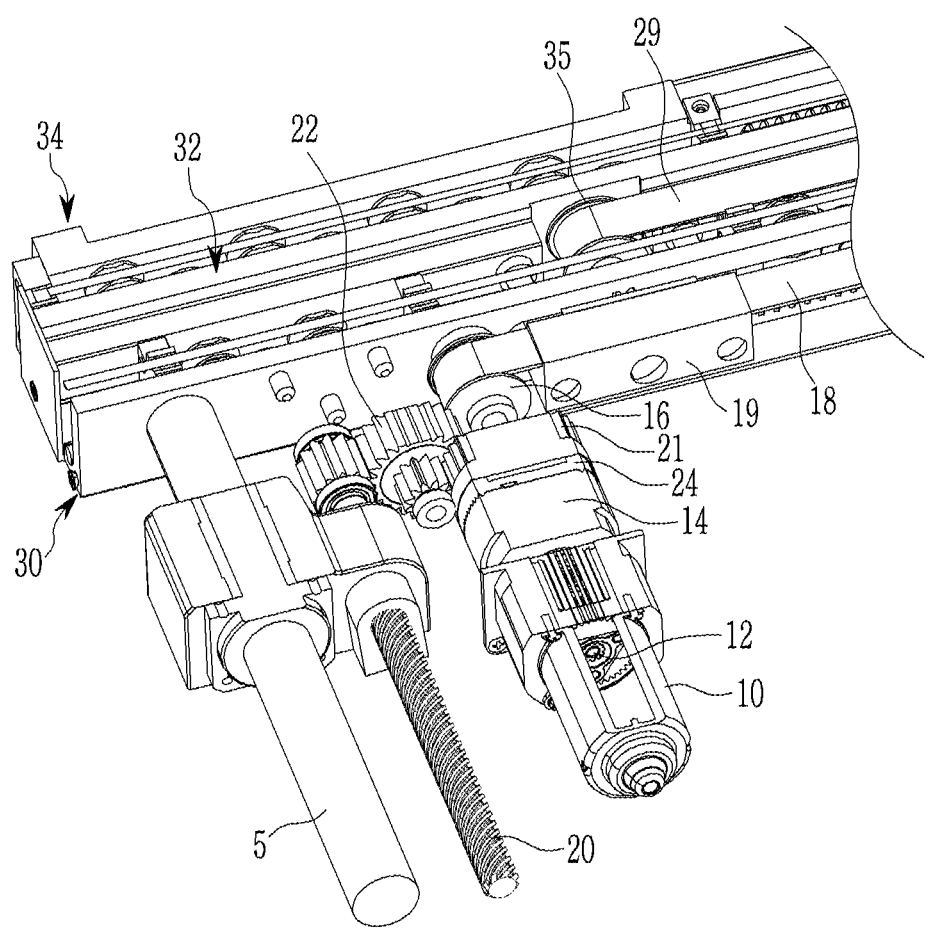
FIG. 19 is an enlarged view of a pulley-belt unit and a rail unit of a door open-close device for a vehicle according to an exemplary embodiment of the present disclosure.
Figure 20:
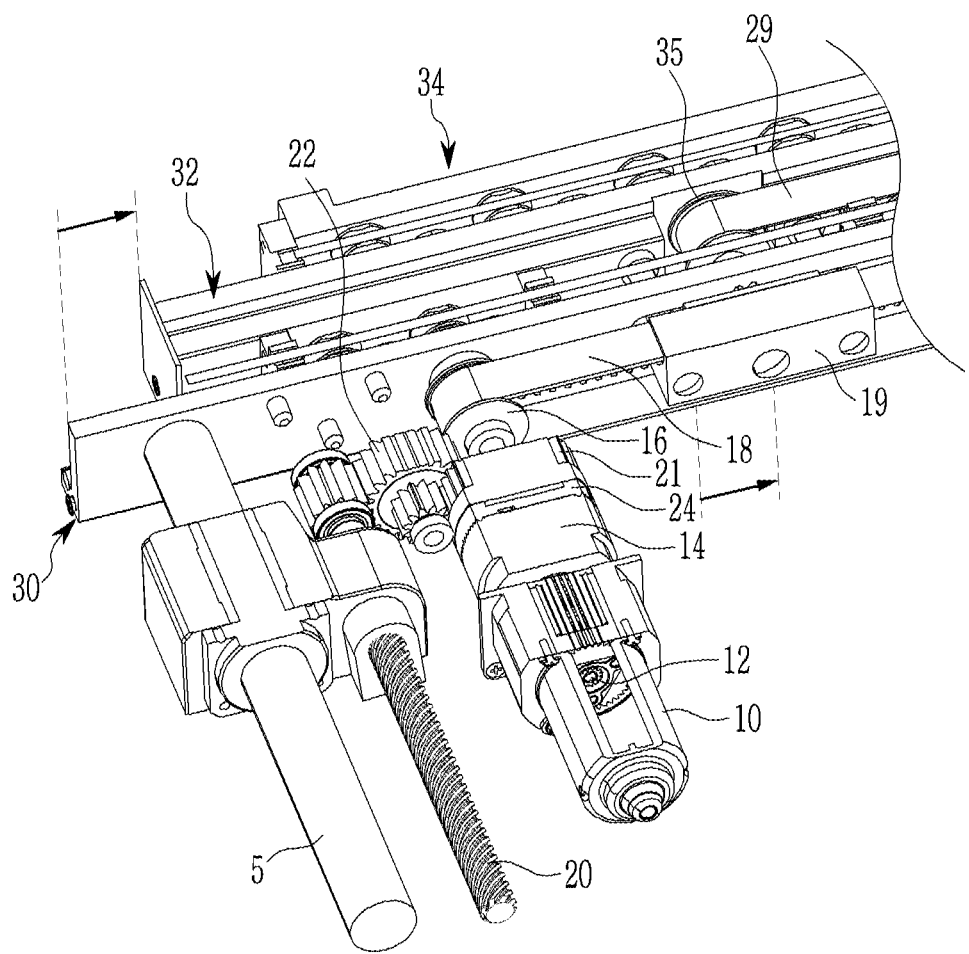
FIG. 20 is a diagram showing a state in which a second rail of a rail unit of a door open-close device for a vehicle slides and moves according to an exemplary embodiment of the present disclosure.
Figure 21:
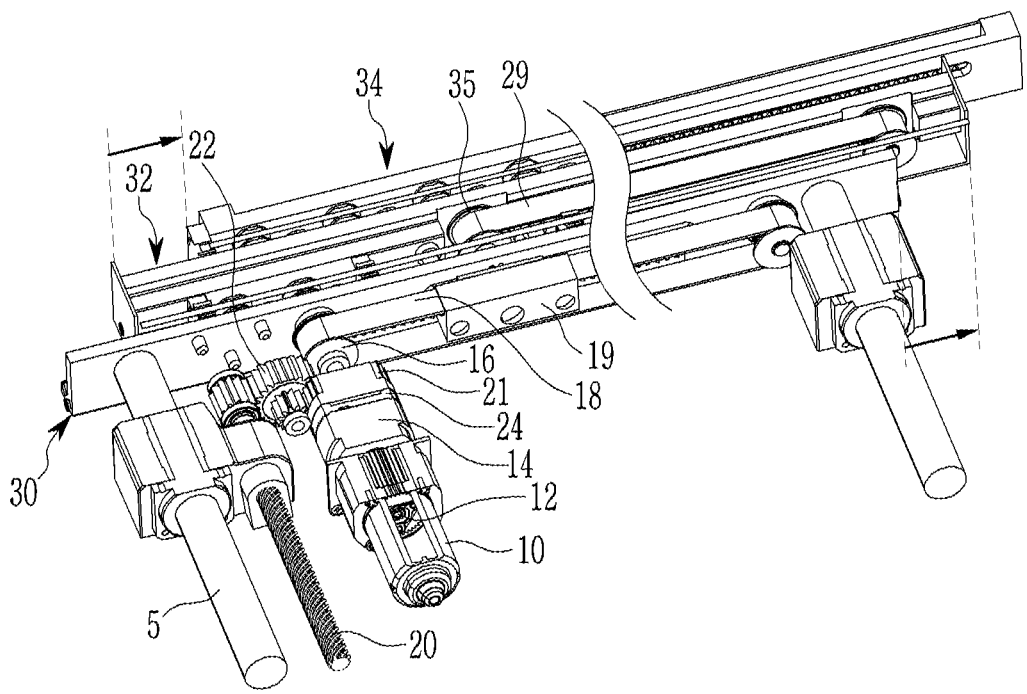
FIG. 21 is a diagram showing a state in which a third rail of a rail unit of a door open-close device for a vehicle slides and moves according to an exemplary embodiment of the present disclosure.

FIG. 17 is a front diagram showing cross sections of a pulley-belt unit and a rail unit of the door open-close device for the vehicle according to an exemplary embodiment of the present disclosure. FIG. 18 is a perspective view showing cross sections of the pulley-belt unit and the rail unit of the door open-close device for the vehicle according to an exemplary embodiment of the present disclosure. FIG. 19 is an enlarged view of the pulley-belt unit and the rail unit of the door open-close device for the vehicle according to an exemplary embodiment of the present disclosure. FIG. 20 is a diagram showing a state in which a second rail of the rail unit of the door open-close device for the vehicle slides and moves according to an exemplary embodiment of the present disclosure. FIG. 21 is a diagram showing a state in which a third rail of the rail unit of the door open-close device for the vehicle slides and moves according to an exemplary embodiment of the present disclosure.

Referring to FIGS. 17 to 21, the belt carrier 19 is provided on the belt 18 connecting the first pulley 16 and the second pulley 17, and the first pinion gear 31 is provided to penetrate the first rail 30 and is formed in a central portion of the belt carrier 19. The first rack gear 33 extending in a longitudinal direction of the first rail 30 is formed on a lower surface of the first rail 30, and the first pinion gear 31 of the belt carrier 19 is engaged with the first rack gear 33 and moves.

The belt carrier 19 is provided to penetrate the first rail 30 and extends so that the coupling pin 15 coupled to a lower portion of the second rail 32 is formed. Accordingly, as the belt carrier 19 is engaged with the first rack gear 33 and moves in the longitudinal direction of the first rail 30, the second rail 32 fixed to the coupling pin 15 slides and moves.

The pulleys 35 and 39 include the third pulley 35 provided at the lower portion of the second rail 32, and the fourth pulley 39 connected to rotate on the opposite side of the lower portion of the second rail 32 spaced apart from the third pulley 35. The third pulley 35 and fourth pulley 39 may be connected to a belt 29 that moves linearly by rotation of the third pulley 35 and the fourth pulley 39.

As the belt carrier 19 moves, the second rail 32 moves, and the third pulley 35 and the fourth pulley 39 provided on the second rail 32 rotate. Accordingly, the belt 29 connected to the third pulley 35 and the fourth pulley 39 moves linearly.

Meanwhile, the second pinion gear 37 penetrating the third rail 34 is coaxially provided in the fourth pulley 39, and is engaged with the second rack gear 38 formed in the third rail 34. Therefore, when the fourth pulley 39 rotates, the second pinion gear 37 is engaged with the second rack gear 38 of the third rail 34, and the third rail 34 slides and moves.

The sliding movement of the second rail 32 and the third rail 34 may be smoothly performed by a plurality of roller bearings 40. That is, the second rail 32 may slide and move in the longitudinal direction of the first rail 30 by rolling of the roller bearings 40 provided on the second rail 32, and the third rail 34 may slide and move in the longitudinal direction of the second rail 32 by rolling of the roller bearings 40 provided on the third rail 34.

Meanwhile, an opening process by pop-up and sliding of the door 2 while the door 2 is closed has been described above, but on the other hand, a closing process by sliding the door 2 and releasing the pop-up of the door 2 while the door 2 is open may be performed in the reverse order of the above description.

As described above, according to an exemplary embodiment of the present disclosure, a center rail/door arm structure is removed from a counter sliding door structure of a vehicle without a B-pillar, and thus, a door opening width may be maximized.

Furthermore, an upper rail/door arm structure in which sliding and pop-up operations of a door are implemented is introduced, and thus, a door rotation radius is minimized, minimizing an amount of protrusion toward the outside of a vehicle body of the door when the door is opened.

Furthermore, a rail unit with a 3-stage telescopic structure is applied, and thus, openness and robustness may be simultaneously secured.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door open-close apparatus configured to open or close a door opening portion of a vehicle by sliding and popping up a door formed in a vehicle body, the door open-close apparatus comprising:
    a driving unit configured to provide a driving force for sliding and pop-up operations of the door;
    a gear unit configured to be selectively engaged to the driving unit to receive the driving force from the driving unit and cause the door to pop up;
    a pulley-belt unit configured to be selectively engaged to the driving unit to receive the driving force from the driving unit and allow the door to slide; and
    a rail unit engaged to the pulley-belt unit, connected to the door and configured to provide a path for the door to slide by operation of the pulley-belt unit.

2. The door open-close apparatus of claim 1, wherein the driving unit includes:
    a driving motor;
    clutches connected to the driving motor and configured to rotate by a rotation force of the driving motor; and
    an electromagnet to which electric power is supplied or blocked to transmit or block rotation forces of the clutches to the gear unit by selectively coupling the clutches.

3. The door open-close apparatus of claim 2, wherein the clutches include:
    a lower plate coaxially connected to a motor shaft of the driving motor and configured to rotate in synchronization with a rotation of the motor shaft; and
    an upper plate coaxially coupled to the motor shaft and configured to rotate or not rotate according to whether to be in contact with the lower plate by the electromagnet.

4. The door open-close apparatus of claim 3, wherein
    in response that the electric power is supplied to the electromagnet, the upper plate and the lower plate are in contact with each other, and
    in response that the electric power is not supplied to the electromagnet, the upper plate and the lower plate are released from contact therebetween.

5. The door open-close apparatus of claim 4, wherein the gear unit includes:
    a driving gear coaxially connected to the upper plate, coupled to a lower portion of the rail unit, and configured to rotate in synchronization with the upper plate;
    an intermediate gear engaged with the driving gear and configured to rotate at the lower portion of the rail unit;
    a lead screw engaged with the intermediate gear and configured to rotate at the lower portion of the rail unit; and
    a first fixing bracket fixed to the vehicle body, coupled to the lead screw inserted thereinto, and configured to support the driving unit to move toward an outside of the vehicle body in response that the lead screw rotates.

6. The door open-close apparatus of claim 5, further including:
    a first guide bar coupled into the first fixing bracket, connected to a lower portion of a first side of the rail unit, configured to extend in a direction parallel to the lead screw, and guide a movement of the lead screw.

7. The door open-close apparatus of claim 1, further including:
    a second fixing bracket fixed to the vehicle body; and
    a second guide bar connected to a lower portion of a second side of the rail unit and slidably coupled to the second fixing bracket.

8. The door open-close apparatus of claim 5,
    wherein the rail unit includes a plurality of rails telescopically coupled to each other, and
    wherein one of the plurality of rails is connected to the driving unit.

9. The door open-close apparatus of claim 8, wherein the plurality of rails includes:
    a first rail connected to the driving unit;
    a second rail connected to the first rail and configured to slide and move along the first rail; and
    a third rail connected to the second rail and configured to slide and move along the second rail.

10. The door open-close apparatus of claim 9,
wherein the second rail is configured to slide and move in a longitudinal direction of the first rail by rolling of roller bearings provided on the second rail, and
wherein the third rail is configured to slide and move in a longitudinal direction of the second rail by rolling of roller bearings provided on the third rail.

11. The door open-close apparatus of claim 9, wherein the pulley-belt unit includes:
pulleys provided on a lower portion of the first rail and engaged to the driving unit to receive the driving force from the driving unit and rotate;
a belt coupled to the pulleys and configured to move linearly by rotation of the pulleys; and
a belt carrier connected to the belt and configured to move linearly by a movement of the belt.

12. The door open-close apparatus of claim 11, wherein the pulleys include:
a first pulley coaxially connected to the driving gear and connected to the driving gear to rotate at the lower portion of the first rail; and
a second pulley connected to rotate on an opposite side to the lower portion of the first rail spaced apart from the first pulley.

13. The door open-close apparatus of claim 12,
wherein the belt includes a first belt, and
wherein the first pulley and the second pulley are connected to the first belt configured to move linearly by rotation of the first pulley and the second pulley.

14. The door open-close apparatus of claim 12, wherein the belt carrier includes:
a first pinion gear engaged with a first rack gear extending in a longitudinal direction of the first rail and formed on a lower surface of the first rail and configured to move.

15. The door open-close apparatus of claim 14, wherein the belt carrier is connected to a lower portion of the second rail by a coupling pin.

16. The door open-close apparatus of claim 15, wherein the pulleys further include:
a third pulley provided at the lower portion of the second rail and connected to the first pinion gear; and
a fourth pulley connected to rotate on an opposite side of the lower portion of the second rail spaced apart from the third pulley.

17. The door open-close apparatus of claim 16,
wherein the belt includes a second belt, and
wherein the third pulley and the fourth pulley are connected to the second belt configured to move linearly by rotation of the third pulley and the fourth pulley.

18. The door open-close apparatus of claim 17, wherein the fourth pulley includes a second pinion gear engaged with a second rack gear extending and formed in a longitudinal direction of the third rail, and configured to rotate to move the third rail in the longitudinal direction in response that the fourth pulley rotates.

* * * * *